(12) United States Patent
Ando et al.

(10) Patent No.: US 8,819,418 B2
(45) Date of Patent: Aug. 26, 2014

(54) COMMUNICATION SYSTEM, VEHICLE-MOUNTED TERMINAL, ROADSIDE DEVICE

(75) Inventors: Eriko Ando, Yokohama (JP); Ken Naganuma, Yokohama (JP); Toru Owada, Yokohama (JP)

(73) Assignee: Renesas Electronics Corporation

( * ) Notice: Subject to any disclaimer, the term of this patent is extended or adjusted under 35 U.S.C. 154(b) by 0 days.

(21) Appl. No.: 13/698,359

(22) PCT Filed: Apr. 21, 2011

(86) PCT No.: PCT/JP2011/059808
§ 371 (c)(1),
(2), (4) Date: Nov. 16, 2012

(87) PCT Pub. No.: WO2011/148744
PCT Pub. Date: Jan. 12, 2011

(65) Prior Publication Data
US 2013/0067220 A1   Mar. 14, 2013

(30) Foreign Application Priority Data

May 24, 2010  (JP) .................. 2010-118048

(51) Int. Cl.
H04L 9/32   (2006.01)
H04L 9/08   (2006.01)
H04L 29/06  (2006.01)

(52) U.S. Cl.
CPC .................. H04L 9/3268 (2013.01)
USPC .......................... 713/156; 713/158

(58) Field of Classification Search
USPC ........................................ 713/158
See application file for complete search history.

(56) References Cited

U.S. PATENT DOCUMENTS 7,596,606 B2 *  9/2009  Codignotto .................. 709/206
(Continued)

FOREIGN PATENT DOCUMENTS

| EP | 2 034 661 A1 | 3/2009 |
| JP | 2007-088737 A | 4/2007 |
| JP | 2008-060789 A | 3/2008 |

OTHER PUBLICATIONS

Maxim Raya, Panos Papadimitratos, and Jean-Pierre Hubaux, EPFL, "Securing Vehicular Communications", Oct. 2006, IEEE Wireless Communications.*

(Continued)

*Primary Examiner* — Gilberto Barron, Jr.
*Assistant Examiner* — Wayne An
(74) *Attorney, Agent, or Firm* — Sughrue Mion, PLLC

(57) ABSTRACT

A communication system includes a certificate authority for performing authentication, a roadside device, a vehicle-mounted terminal, a first server, and a second server. The vehicle-mounted terminal transmits position information to the first server. The certificate authority acquires information about a vehicle-mounted terminal likely to appear according to place and time from the first server. The certificate authority allows the second server to verify validity of a certificate for a vehicle-mounted terminal acquired from the first server. The certificate authority generates a first list of vehicle-mounted terminals having valid certificates and a second list of vehicle-mounted terminals having invalid certificates according to place and time based on a verification result. The certificate authority transmits the first and second lists to the roadside device and the vehicle-mounted terminal. The roadside device and the vehicle-mounted terminal verify a certificate using the received first and second lists thereby reducing the certificate verification time.

8 Claims, 13 Drawing Sheets

(56) References Cited

U.S. PATENT DOCUMENTS

| | | | |
|---|---|---|---|
| 7,634,654 B2* | 12/2009 | Kakii | 713/158 |
| 8,219,132 B2* | 7/2012 | Hayashi | 455/517 |
| 8,522,013 B2* | 8/2013 | Zhang et al. | 713/158 |
| 2007/0187491 A1* | 8/2007 | Godwin et al. | 235/380 |
| 2009/0083852 A1* | 3/2009 | Kuo et al. | 726/22 |
| 2009/0187983 A1 | 7/2009 | Zerfos et al. | |
| 2009/0260057 A1* | 10/2009 | Laberteaux et al. | 726/2 |

OTHER PUBLICATIONS

Ameneh Daeinabi and Akbar Ghaffarpour Rahbar, "Detection of malicious vehicles (DMV) through monitoring in Vehicular Ad-Hoc Networks", Apr. 5, 2011, Springer Science+Business Media, LLC 2011.*

Frank Kargl, Elmar Schoch, Bjorn Wiedersheim, and Tim Leinmuller, "Secure and Efficient Beaconing for Vehicular Networks", 2008, DENSO Automotive Deutschland GmbH, Eching, Germany, pp. 82-83.*

* cited by examiner

COMMUNICATION SYSTEM, VEHICLE-MOUNTED TERMINAL, ROADSIDE DEVICE

TECHNICAL FIELD

The present invention relates to a communication technology that ensures message validity using a public key encryption system during road-to-vehicle or vehicle-to-vehicle communication.

BACKGROUND ART

A recent trend is to evolve road-to-vehicle or vehicle-to-vehicle communication for the purpose of reducing traffic accident fatalities and promoting preventive safety. It is important for the preventive safety to ensure message integrity because an incorrect message is highly likely to cause a serious accident. For example, it is important to ensure that a message is transmitted from a correct roadside device or a correct vehicle-mounted terminal and that a malicious user does not falsify the message transmitted from a correct roadside device or a correct vehicle-mounted terminal.

The electronic signature using a public key encryption system ensures message validity. The public key encryption system performs encryption and decryption using a pair of two keys, a private key and a public key. The private key needs to be secretly managed. The public key may be made public. The electronic signature using the public key encryption system is equivalent to data resulting from encrypting a hash value for the message based on the private key. A message sender transmits the message along with the signature. A message recipient acquires the sender's public key and decrypts the signature. The message recipient verifies the signature by determining whether the decrypted value equals a hash value generated from the received message.

Verifying the public key validity is important for the electronic signature using the public key encryption. Generally, a certificate authority supplies the signature to the public key. If the certificate authority is hierarchically structured, a high-order certificate authority supplies the signature to the public key for a low-order certificate authority and this is repeated.

The signature verification for messages is repeated and is therefore time-consuming. The following patent document discusses the scheme compliant with a system that requires high-speed signature verification for communication with a fast moving vehicle.

RELATED ART DOCUMENTS

Patent Document

Patent Document 1: Japanese Unexamined Patent Publication No. 2007-88737

DISCLOSURE OF THE INVENTION

Problems that the Invention is to Solve

According to the technology described in the patent document 1, a local certificate authority manages more than one roadside device and issues a certificate to a roadside device to be managed. The roadside device periodically transmits a local certificate, namely, a certificate from the local certificate authority, to a vehicle-mounted terminal. When receiving a message, the vehicle-mounted terminal can verify the message signature based on trust in the local certificate while the same local certificate is received. The vehicle-mounted terminal can shorten the verification time.

However, the public key encryption system does not shorten the signature verification time if the system is used for the vehicle-to-vehicle communication. This is because the vehicle-to-vehicle communication provides the short communication time, namely, the short time to receive the same certificate. Verifying the certificate requires confirming whether the certificate is valid. However, many vehicles are moving across a wide area. There may arise a problem of increasing the size of a CRL (Certificate Revocation List) to be distributed to a roadside base station and vehicle-mounted terminals. While the OCSP (Online Certificate Status Protocol) does not use the CRL, the above-mentioned public key encryption system increases the number of inquiries into the server.

It is an object of the invention to provide a technology of reducing the certificate verification time in a communication system.

These and other objects and novel features of the invention may be readily ascertained by referring to the following description and appended drawings.

Means for Solving the Problems

The following summarizes representative aspects of the invention disclosed in this application.

A communication system includes: a certificate authority that performs authentication; a roadside device provided at a roadside; a vehicle-mounted terminal mounted on a vehicle; a first server that collects position information about the vehicle-mounted terminal; and a second server that manages information about a roadside device and a vehicle-mounted terminal whose certificate is invalidated. The vehicle-mounted terminal transmits its own position information to the first server. The certificate authority acquires information about a vehicle-mounted terminal highly likely to appear according to place and time from the first server. The certificate authority allows the second server to verify validity of a certificate for a vehicle-mounted terminal acquired from the first server. The certificate authority generates a first list of vehicle-mounted terminals having valid certificates and a second list of vehicle-mounted terminals having invalid certificates according to place and time based on a verification result. The certificate authority transmits the first list and the second list to the roadside device and the vehicle-mounted terminal. The roadside device and the vehicle-mounted terminal verify a certificate using the received first and second lists.

Effects of the Invention

The following summarizes an effect provided by the representative aspects of the invention disclosed in this application.

The invention can shorten the certificate verification time.

Figure 1:
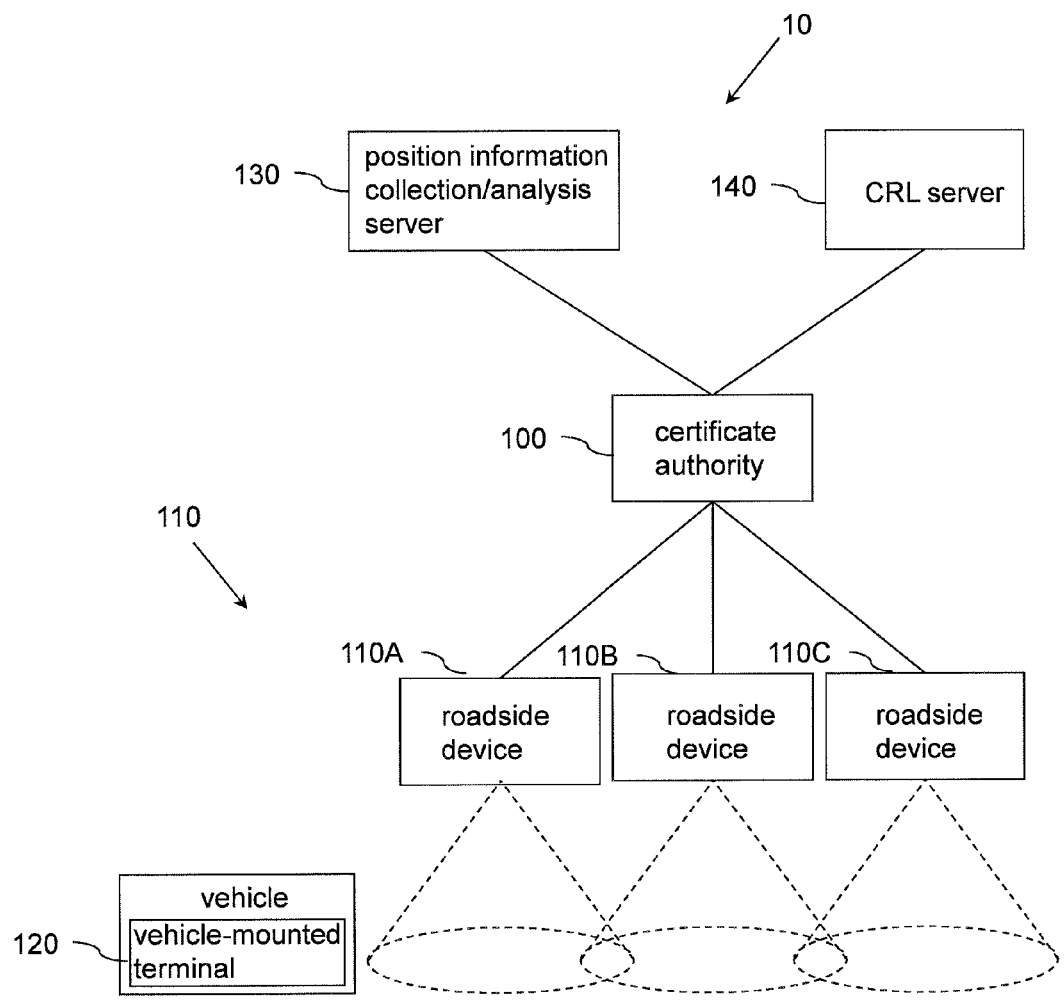
FIG. 1 is a block diagram illustrating an overall example configuration of a communication system according to the invention.

EXPLANATION OF REFERENCE NUMERALS 10 communication system
100 certificate authority
110 roadside device
120 vehicle-mounted terminal
130 position information collection/analysis server
140 CRL server
200 root certificate authority
210 intermediate certificate authority
220 low-order certificate authority

BEST MODE FOR CARRYING OUT THE INVENTION

1. Summary of the Embodiments

The following summarizes representative embodiments of the invention disclosed in this specification. In the following description, parenthesized reference numerals correspond to those shown in the appended drawings and just denote examples belonging to the concept of the corresponding components.

[1] A communication system (10) according to a representative embodiment of the invention includes: a certificate authority (100) that performs authentication; a roadside device (110) provided at a roadside; a vehicle-mounted terminal (120) mounted on a vehicle; a first server (130) that collects position information about the vehicle-mounted terminal; and a second server (140) that manages information about a roadside device and a vehicle-mounted terminal whose certificate is invalidated. The vehicle-mounted terminal transmits its own position information to the first server. The certificate authority acquires information about a vehicle-mounted terminal highly likely to appear according to place and time from the first server. The certificate authority allows the second server to verify validity of a certificate for a vehicle-mounted terminal acquired from the first server. The certificate authority generates a first list (whitelist) of vehicle-mounted terminals having valid certificates and a second list (blacklist) of vehicle-mounted terminals having invalid certificates according to place and time based on a verification result. The certificate authority transmits the first list and the second list to the roadside device and the vehicle-mounted terminal. The roadside device and the vehicle-mounted terminal verify a certificate using the received first and second lists.

According to the above-mentioned configuration, the certificate authority acquires information about a vehicle-mounted terminal highly likely to appear according to place and time from the first server. The certificate authority allows the second server to verify validity of a certificate for a vehicle-mounted terminal acquired from the first server. The certificate authority generates a first list of vehicle-mounted terminals having valid certificates and a second list of vehicle-mounted terminals having invalid certificates according to place and time based on a verification result. The certificate authority transmits the first list and the second list to the roadside device and the vehicle-mounted terminal. The roadside device and the vehicle-mounted terminal can verify the certificate using the received first and second lists. Thus, the certificate verification time can be reduced.

[2] According to [1], the roadside device and the vehicle-mounted terminal can omit certificate verification and discard a received message if the second list contains a message sender. Alternatively, the roadside device and the vehicle-mounted terminal can omit certificate verification and verify a signature if the first list contains a message sender. The roadside device and the vehicle-mounted terminal need not inquire of the second server each time a message is received. Thus, the signature verification time can be reduced.

[3] According to [2] above, the roadside device can transmit information needed for authentication and key sharing to the vehicle-mounted terminal and the nearby roadside device when the vehicle-mounted terminal acquires a common key needed to verify validity of the first list and the second list from the roadside device. Sharing the information can reduce the processing time.

[4] According to [3] above, the roadside device and the vehicle-mounted terminal can confirm effective place and effective time in the first list and the second list and delete the first list and the second list if the roadside device and the vehicle-mounted terminal satisfy one of conditions of existing outside the effective place and exceeding the effective time. This can avoid an unnecessary increase in sizes of the first list and the second list.

[5] According to [4] above, the roadside device or the vehicle-mounted terminal can detect an invalidated certificate during vehicle-to-vehicle communication or road-to-vehicle communication and notify this information to a certificate authority. The certificate authority can generate the second list and transmit the second list to a roadside device and a vehicle-mounted terminal near a detection place. The second list is updated in this manner.

[6] A vehicle-mounted terminal according to a representative embodiment of the invention transmits and receives information from a roadside device or another vehicle-mounted terminal. The vehicle-mounted terminal includes: a storage portion (126) that stores a first list of vehicle-mounted terminals having valid certificates according to place and time and a second list of vehicle-mounted terminals having invalidated certificates; and a signature generation/verification portion (124) that performs: omitting certificate verification and discarding a received message if the second list contains a message sender; or omitting certificate verification and verifying a signature if the first list contains a message sender. This configuration can provide a vehicle-mounted terminal appropriate for the communication system.

[7] According to [6], a processing portion (122) can be provided to confirm effective place and effective time in the first list and the second list and delete the first list and the second list if the vehicle-mounted terminal exists outside the effective place or exceeds the effective time.

[8] A roadside device (110) according to a representative embodiment of the invention transmits and receives information from a vehicle-mounted terminal. The roadside device includes: a storage portion (116) that stores a first list of vehicle-mounted terminals having valid certificates according to place and time and a second list of vehicle-mounted terminals having invalidated certificates; and a signature generation/verification portion (114) that performs: omitting certificate verification and discarding a message received from a vehicle-mounted terminal if the second list contains a message sender; and omitting certificate verification and verifying a signature if the first list contains a message sender. This configuration can provide a roadside device appropriate for the communication system.

[9] According to [8], a communication control processing portion (111) can be provided to transmit information needed for authentication and key sharing to the vehicle-mounted terminal and the nearby roadside device when the vehicle-mounted terminal acquires a common key needed to verify validity of the first list and the second list from the roadside device.

[10] According to [9], a processing portion (112) can be provided to confirm effective time in the first list and the second list and delete the first list and the second list if the roadside device exceeds the effective time.

2. Further Detailed Description of the Embodiments

The embodiments will be described in more detail. FIG. 1 illustrates an overall example configuration of a communication system according to the invention. A communication system 10 illustrated in FIG. 1 includes a certificate authority 100, a roadside device 110, a vehicle-mounted terminal 120, a position information collection/analysis server 130, and a CRL server 140, but not limited thereto. The certificate authority 100 can communicate with the roadside device 110. The roadside device 110 includes roadside devices 110A, 110B, and 110C that are provided at a specified interval on the roadside. The certificate authority 100 issues a roadside device certificate and a vehicle-mounted terminal certificate to the roadside device 110 and the vehicle-mounted terminal 120, respectively. A certificate may be compliant with ITU (International Telecommunication Union) X.509. The certificate authority 100 issues a certificate authority certificate on which the certificate authority 100 itself puts its signature. The certificate authority 100 is capable of safe communication with the position information collection/analysis server 130 and the CRL server 140. Wireless or wired communication may be available between the certificate authority 100 and the roadside device 110, between the certificate authority 100 and the position information collection/analysis server 130, and between the certificate authority 100 and the CRL server 140. The position information collection/analysis server 130 collects position information about the vehicle-mounted terminal 120 and analyzes a congestion situation, for example. The information collected from the vehicle-mounted terminal 120 may include a speed, a destination, and a path for the vehicle-mounted terminal 120 as well as the position information. The CRL server 140 manages information about the roadside device 110 and the vehicle-mounted terminal 120 whose certificate is invalidated. The roadside device 110 can communicate with the certificate authority 100 and wirelessly communicates with the vehicle-mounted terminal 120 that exists within a communication range. As illustrated in FIG. 1, communication ranges for the roadside devices 110A, 110B, and 110C overlap with each other, but may not overlap with each other.

Figure 2:
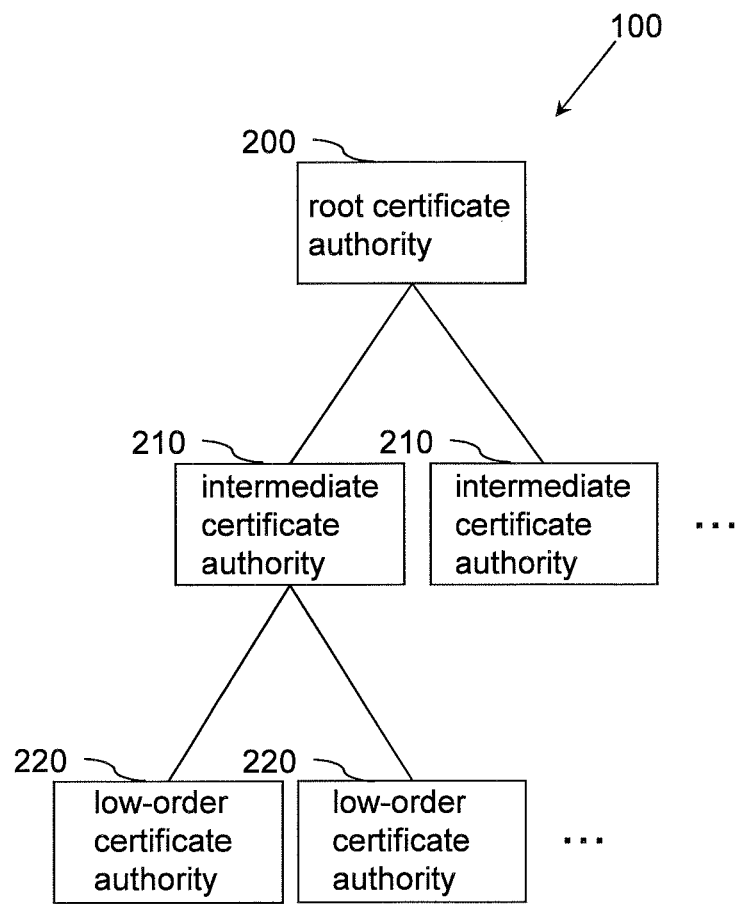
FIG. 2 is a block diagram illustrating an example configuration of a certificate authority in the communication system according illustrated in FIG. 1.

As illustrated in FIG. 2, the certificate authority 100 may hierarchically include a root certificate authority 200, an intermediate certificate authority 210, and a low-order certificate authority 220. The intermediate certificate authority 210 may include any number of hierarchies. The root certificate authority 200 issues a certificate for the intermediate certificate authority 210. The intermediate certificate authority 210 issues a certificate for the low-order certificate authority 220. The root certificate authority 200 issues a root certificate authority certificate on which the root certificate authority 200 itself puts its signature. As more than one organization links with each other, there may be provided more than one root certificate authority to configure a trusting model such as a mesh model or a bridge model.

Figure 3:
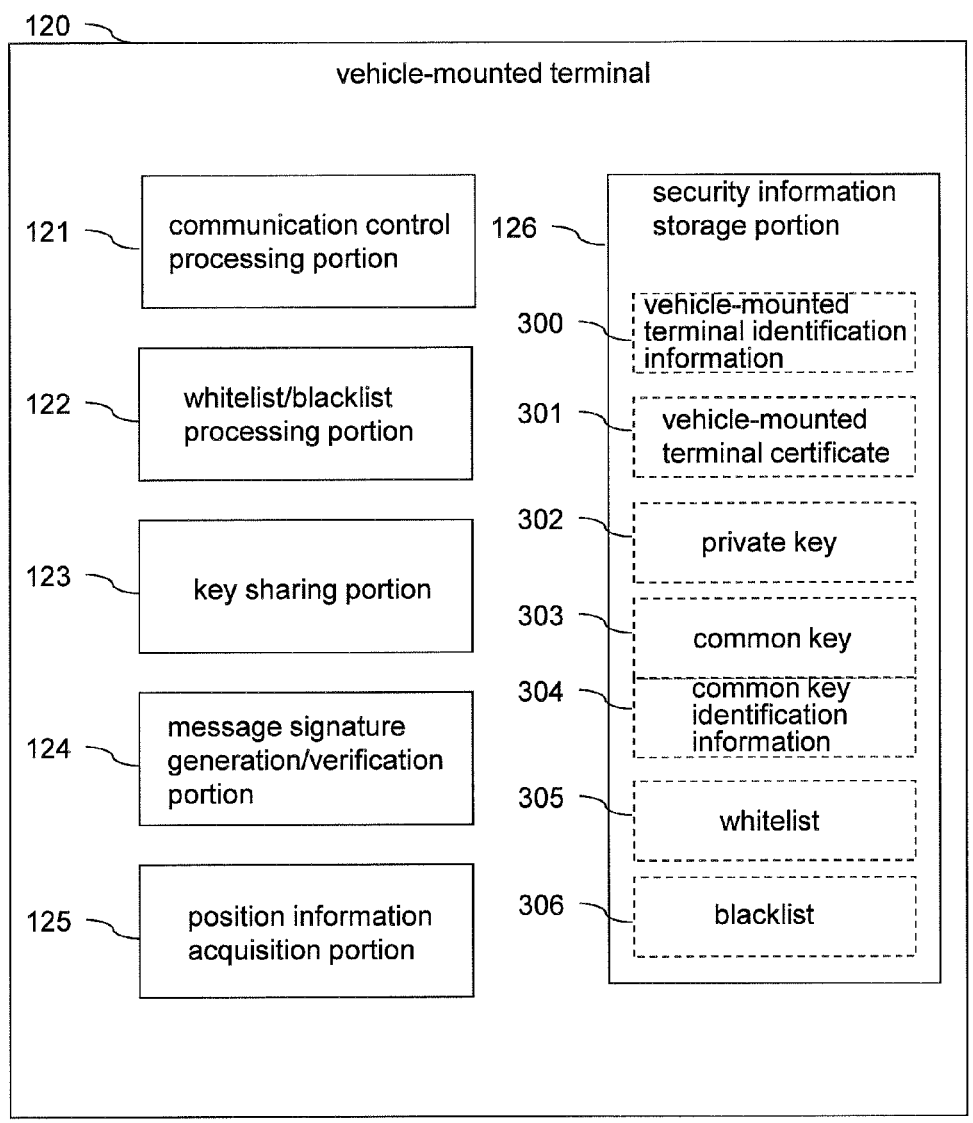
FIG. 3 is a block diagram illustrating an example configuration of a vehicle-mounted terminal in the communication system according illustrated in FIG. 1.

FIG. 3 illustrates an example configuration of the vehicle-mounted terminal 120.

The vehicle-mounted terminal 120 includes a communication control processing portion 121, a whitelist/blacklist processing portion 122, a key sharing portion 123, a message signature generation/verification portion 124, a position information acquisition portion 125, and a security information storage portion 126. The communication control processing portion 121 performs a process to communicate with the roadside device 110 or another vehicle-mounted terminal 120. The whitelist/blacklist processing portion 122 performs a process when a whitelist and a blacklist are received from the roadside device 110. In addition, the whitelist/blacklist processing portion 122 periodically confirms validity of the whitelist and the blacklist. The key sharing portion 123 performs a process to acquire a common key from the roadside device 110. The common key is needed for MAC (Message Authentication Code) verification that confirms integrity of the whitelist and the blacklist. When a message is received from the roadside device 110 or the vehicle-mounted terminal 120, the message signature generation/verification portion 124 determines whether the whitelist or the blacklist contains a sender of the message. The message signature generation/verification portion 124 determines whether to omit the certificate verification or whether to verify the signature. The message signature generation/verification portion 124 performs a process appropriate to the determination result. When transmitting a message, the message signature generation/verification portion 124 generates a signature corresponding to the message, passes the message, the signature, and the vehicle-mounted terminal certificate to the communication control processing portion 121, and requests the communication control processing portion 121 to transmit the message. The position information acquisition portion 125 acquires its position information and requests the communication control processing portion 121 to transmit the position information. A means for acquiring the position information may be provided as a GPS (Global Positioning System) mounted on the vehicle-mounted terminal 120 or as another device such as a car navigation system mounted on a vehicle. If another vehicle-mounted device has the communication function, the device may transmit the position information to the position information collection/analysis server 130 without passing through the vehicle-mounted terminal 120. The security information storage portion 126 stores vehicle-mounted terminal identification information 300, a vehicle-mounted terminal certificate 301, a private key 302, a common key 303, common key identification information 304, a whitelist 305, and a blacklist 306. The vehicle-mounted terminal identification information 300 provides an identifier (ID) that identifies the vehicle-mounted terminal 120. The vehicle-mounted terminal certificate 301 is issued from the certificate authority 100 to the vehicle-mounted terminal 120. The vehicle-mounted terminal certificate 301 also contains the public key. The private key 302 pairs with the public key described in the vehicle-mounted terminal certificate 301. The common key 303 is used to verify the MAC for a whitelist and a blacklist received from the roadside device. The common key 303 is acquired from the roadside device 110. The common key identification information 304 provides an identifier of the common key 303. The vehicle-mounted terminal 120 manages the common key 303 and the common key identification information 304 as a set. The vehicle-mounted terminal 120 can maintain more than one common key 303 and more than one piece of common key identification information 304. The whitelist 305 lists vehicle-mounted terminals whose certificates are valid. The whitelist 305 is distributed from the certificate authority 100 via the roadside device 110 according to the place and the time. The vehicle-mounted terminal 120 can maintain more than one whitelist 305. The blacklist 306 lists vehicle-mounted terminals whose certificates are invalid. The blacklist 306 is distributed from the certificate authority 100 via the roadside device 110 according to the place and the time. The vehicle-mounted terminal 120 can maintain more than one blacklist 306.

Figure 4:
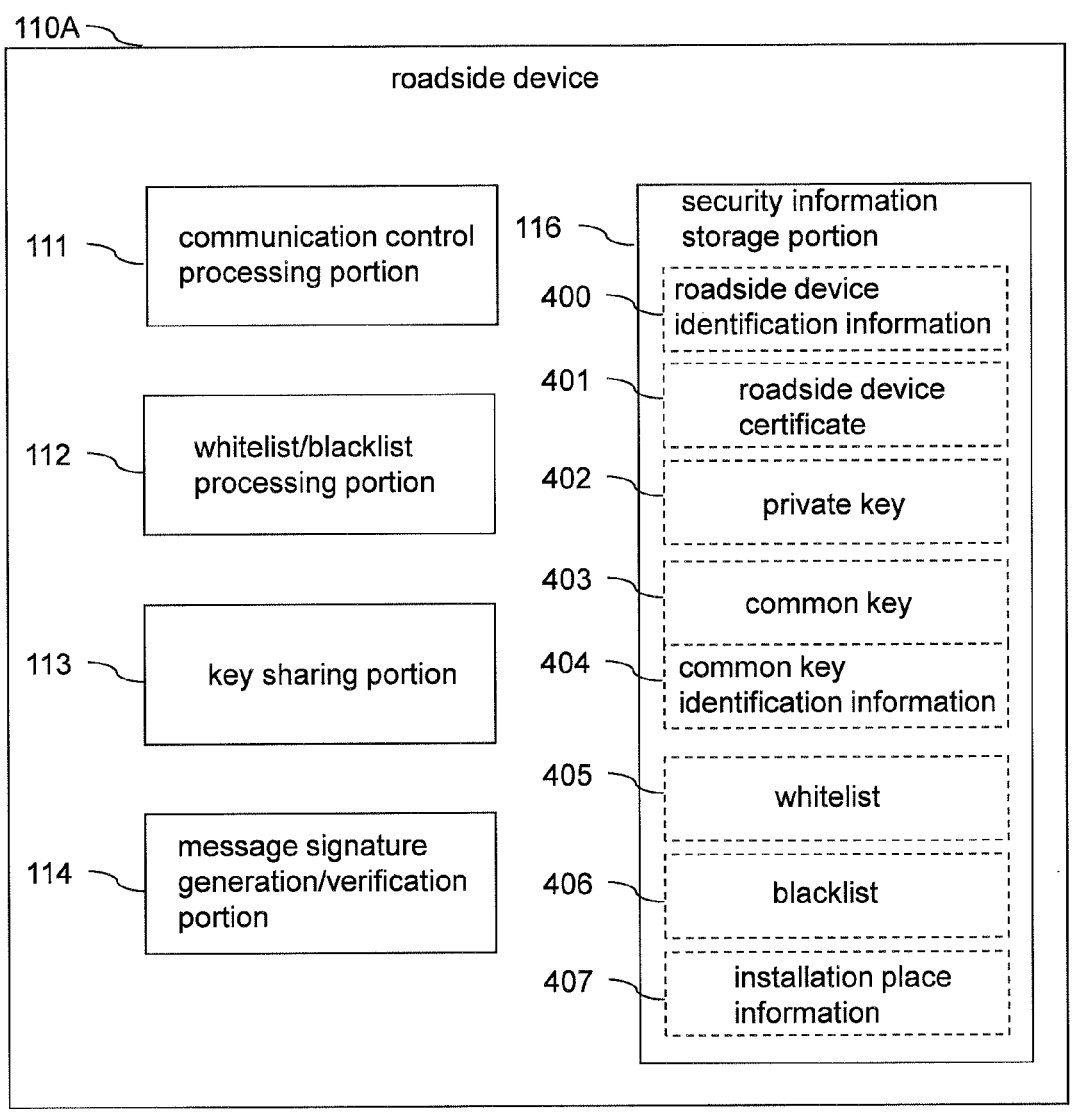
FIG. 4 is a block diagram illustrating an example configuration of a roadside device in the communication system according illustrated in FIG. 1.

FIG. 4 illustrates an example configuration of the roadside device 110A. The other roadside devices 110B and 110C are also configured similarly.

The roadside device 110A includes a communication control processing portion 111, a whitelist/blacklist processing portion 112, a key sharing portion 113, a message signature generation/verification portion 114, and a security information storage portion 116. The communication control processing portion 111 performs a process for communication with the certificate authority 100 or the vehicle-mounted terminal 120. The whitelist/blacklist processing portion 112 performs processes needed when a whitelist and a blacklist are received from the certificate authority 100 and when a whitelist and a blacklist are to be transmitted to the vehicle-mounted terminal 120. The whitelist/blacklist processing portion 112 periodically confirms validity of the whitelist and the blacklist. The key sharing portion 113 performs a process to transmit a common key to the vehicle-mounted terminal 120. The common key is needed for MAC (Message Authentication Code) verification that confirms integrity of the whitelist and the blacklist. When a message is received from the vehicle-mounted terminal 120, the message signature generation/verification portion 114 determines whether the whitelist or the blacklist contains a sender of the message. The message signature generation/verification portion 114 determines whether to omit the certificate verification or whether to verify the signature. The message signature generation/verification portion 114 performs a process appropriate to the determination result. When transmitting a message, the message signature generation/verification portion 114 generates a signature corresponding to the message, passes the message, the signature, and the vehicle-mounted terminal certificate to the communication control processing portion 111, and requests the communication control processing portion 111 to transmit the message. The security information storage portion 116 stores roadside device identification information 400, a roadside device certificate 401, a private key 402, a common key 403, common key identification information 404, a whitelist 405, and a blacklist 406. The roadside device identification information 400 provides an identifier that identifies the roadside device 110A. The roadside device certificate 401 is issued from the certificate authority 100 to the roadside device 110A. The private key 402 pairs with the public key described in the roadside device certificate 401. The common key 403 is used to verify the MAC for a whitelist and a blacklist received from the certificate authority 100. The common key 403 is acquired from the certificate authority 100. The common key identification information 404 provides an identifier of the common key 403. The roadside device 110 manages the common key 403 and the common key identification information 404 as a set. The roadside device 110 can maintain more than one common key 403 and more than one piece of common key identification information 404. The whitelist 405 lists vehicle-mounted terminals whose certificates are valid. The whitelist 405 is distributed from the certificate authority 100 according to the place and the time. The roadside device 110A can maintain more than one whitelist 405. The blacklist 406 lists vehicle-mounted terminals whose certificates are invalid. The blacklist 406 is distributed from the certificate authority 100 according to the place and the time. The roadside device 110A can maintain more than one blacklist 406.

Figure 5:
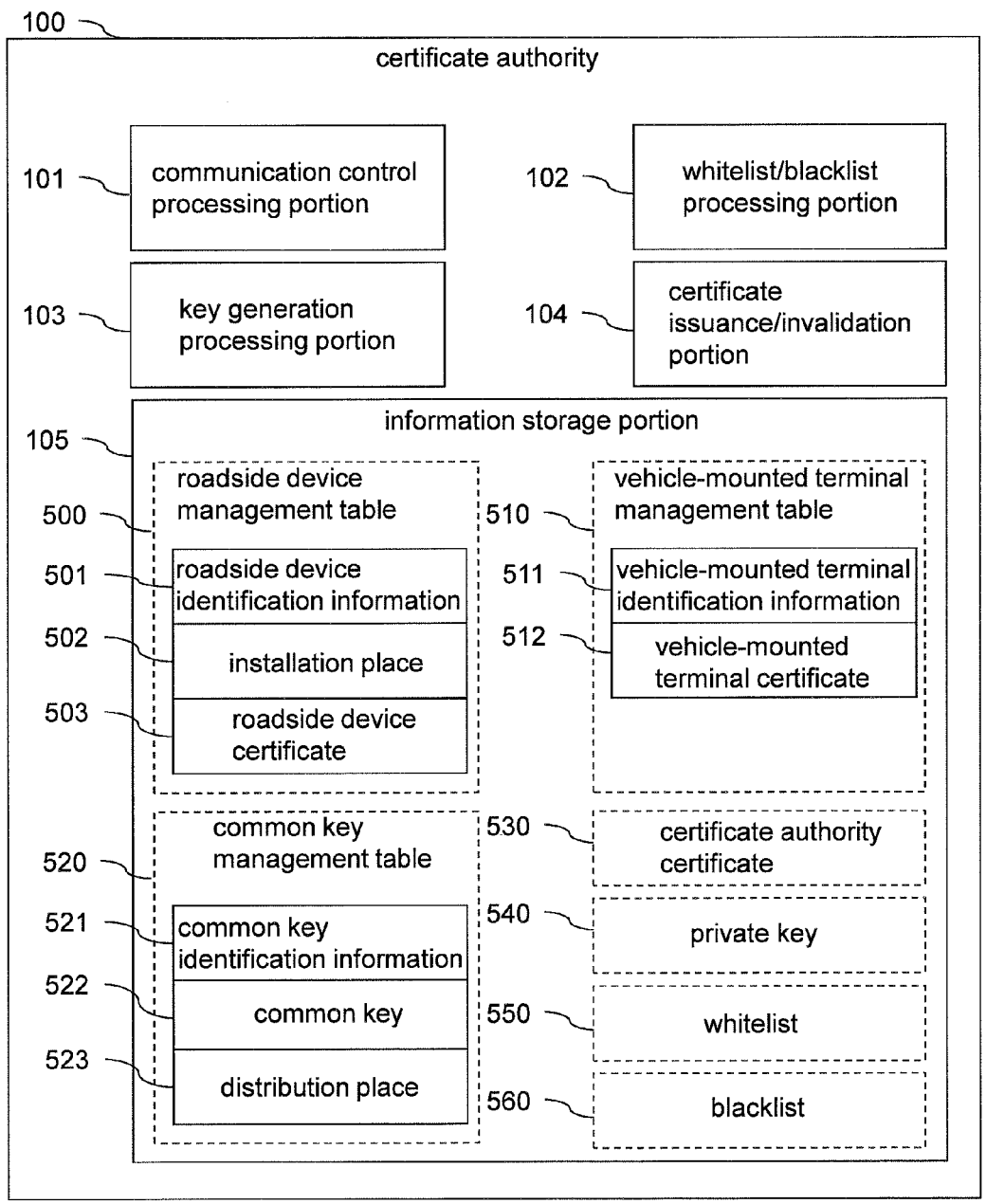
FIG. 5 is a block diagram illustrating an example configuration of a certificate authority in the communication system according illustrated in FIG. 1.

FIG. 5 illustrates an example configuration of the certificate authority 100. The certificate authority 100 includes a communication control processing portion 101, a whitelist/blacklist processing portion 102, a key generation processing portion 103, a certificate issuance/invalidation portion 104, and an information storage portion 105. The communication control processing portion 101 performs a process needed for communication with the roadside device 110, the position information collection/analysis server 130, and the CRL server 140. The whitelist/blacklist processing portion 102 periodically collects information about the vehicle-mounted terminal 120 highly likely to appear according to the place and the time from the position information collection/analysis server 130. The whitelist/blacklist processing portion 102 inquires from the CRL server 140 whether the certificate for the vehicle-mounted terminal 120 is invalid. The whitelist/blacklist processing portion 102 accordingly generates a whitelist or a blacklist. The whitelist/blacklist processing portion 102 generates an MAC for the generated whitelist/blacklist and transmits the MAC to the roadside device 110 via the communication control processing portion 101. The whitelist/blacklist processing portion 102 may receive a message from the roadside device 110 or the vehicle-mounted terminal 120 and the message may notify detection of the vehicle-mounted terminal 120 whose certificate is invalidated. In such a case, the whitelist/blacklist processing portion 102 generates a blacklist and generates an MAC for the blacklist in real time. The key generation processing portion 103 generates a common key used to generate an MAC for the whitelist or the blacklist. The key generation processing portion 103 may generate the common key when generating the whitelist and the blacklist and may transmit the common key as well as the whitelist and the blacklist to the roadside device 110. Alternatively, a previously generated common key may be transmitted to the roadside device 110. The certificate issuance/invalidation portion 104 issues or invalidates a certificate for the roadside device 110 and the vehicle-mounted terminal 120. The information storage portion 105 stores a roadside device management table 500, a vehicle-mounted terminal management table 510, a common key management table 520, a certificate authority certificate 530, a private key 540 paired with a public key described in the certificate authority certificate 530, a whitelist 550, and a blacklist 560. The roadside device management table 500 manages information about the roadside device 110 and includes roadside device identification information 501, an installation place 502, and a roadside device certificate 503. The roadside device identification information 501 provides an identifier of a roadside device. The installation place 502 provides information about an installation place for the roadside device 110 and contains the latitude or the longitude corresponding to the installation place, for example. The roadside device certificate 503 is issued from the certificate authority 100 to the roadside device 110. The vehicle-mounted terminal management table 510 contains vehicle-mounted terminal identification information 511 and a vehicle-mounted terminal certificate 512. The vehicle-mounted terminal identification information 511 identifies a vehicle-mounted terminal. The vehicle-mounted terminal certificate 512 is issued from the certificate authority 100 to the vehicle-mounted terminal 120. The common key management table 520 manages a common key needed to generate an MAC for the whitelist or the blacklist and contains common key identification information 521, a common key 522, and a distribution place 523. The common key identification information 521 provides an identifier of a common key. The common key 522 is generated from the key generation processing portion 103 and is used to generate an MAC for the whitelist/blacklist. The distribution place 523 indicates a place to distribute the whitelist/blacklist provided with the MAC that is generated using the common key 522. For example, the distribution place 523 may be represented as the latitude or the longitude or as a list of vehicle-mounted terminal identification information. The certificate authority itself puts its signature on the certificate authority certificate 530. The private key 540 pairs with the public key described in the certificate authority certificate 530. The certificate authority generates the whitelist 550 and can maintain more than one whitelist. The certificate authority generates the blacklist 560 and can maintain more than one whitelist.

Figure 6:
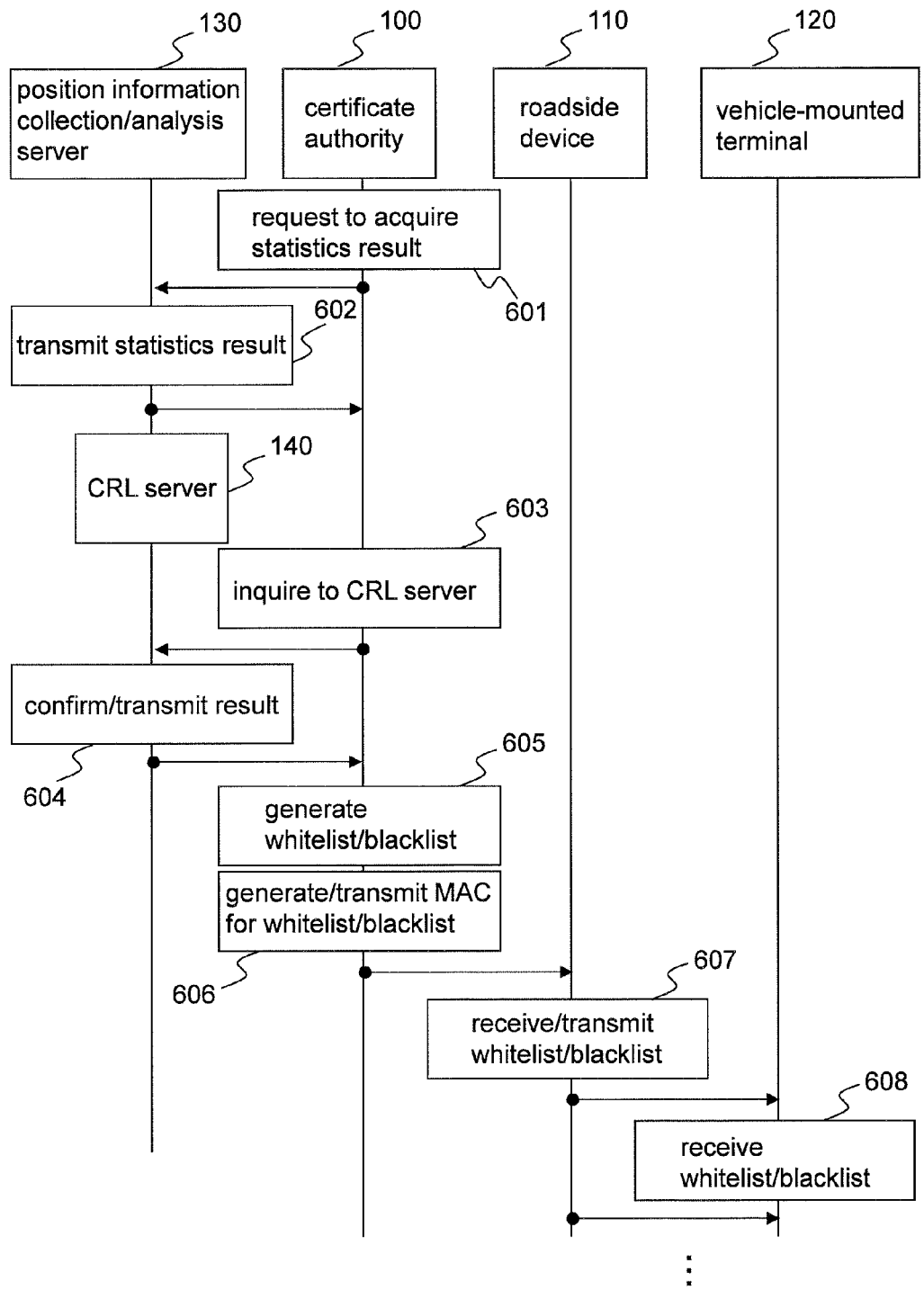
FIG. 6 is a flowchart illustrating creation and distribution of a whitelist and a blacklist.

FIG. 6 is a flowchart illustrating creation and distribution of a whitelist and a blacklist. At step 601, the certificate authority 100 requests the position information collection/analysis server 130 to transmit vehicle-mounted terminal identification information about the vehicle-mounted terminal 120 highly likely to appear according to the place and the time. At step 602, the position information collection/analysis server 130 transmits the information corresponding to the request from the certificate authority 100. At step 603, the certificate authority 100 references the vehicle-mounted terminal management table 510 and acquires the vehicle-mounted terminal certificate 512 corresponding to the vehicle-mounted terminal identification information received from the position information collection/analysis server 130. The certificate authority 100 inquires from the CRL server 140 whether the vehicle-mounted terminal certificate 512 is invalidated. At step 604, the CRL server 140 determines whether the vehicle-mounted terminal certificate 512 transmitted from the certificate authority 100 is invalidated. The CRL server 140 transmits the result to the certificate authority 100. While the certificate authority 100 inquires the certificate invalidation from the CRL server 140 in this example, the certificate authority 100 may acquire a CRL from the CRL server 140 and confirm the certificate invalidation. At step 605, after receiving the result from the CRL server 140, the certificate authority 100 generates a whitelist and a blacklist corresponding to the place and the time based on results acquired from the position information collection/analysis server 130 and the CRL server 140. The format for the whitelist and the blacklist will be described later. At step 606, after generating the whitelist and the blacklist, the certificate authority 100 references the distribution place 523 in the common key management table 520. The certificate authority 100 generates an MAC using the corresponding common key 522 and transmits the MAC along with the whitelist and the blacklist to the roadside device 110. At step 607, the roadside device 110 receives the whitelist and the blacklist, and then periodically transmits the whitelist and the blacklist to the vehicle-mounted terminal 120. At step 608, the roadside device 120 receives the whitelist and the blacklist. Processes of receiving the whitelist and the blacklist on the roadside device 110 and the vehicle-mounted terminal 120 will be described later.

Figure 7:
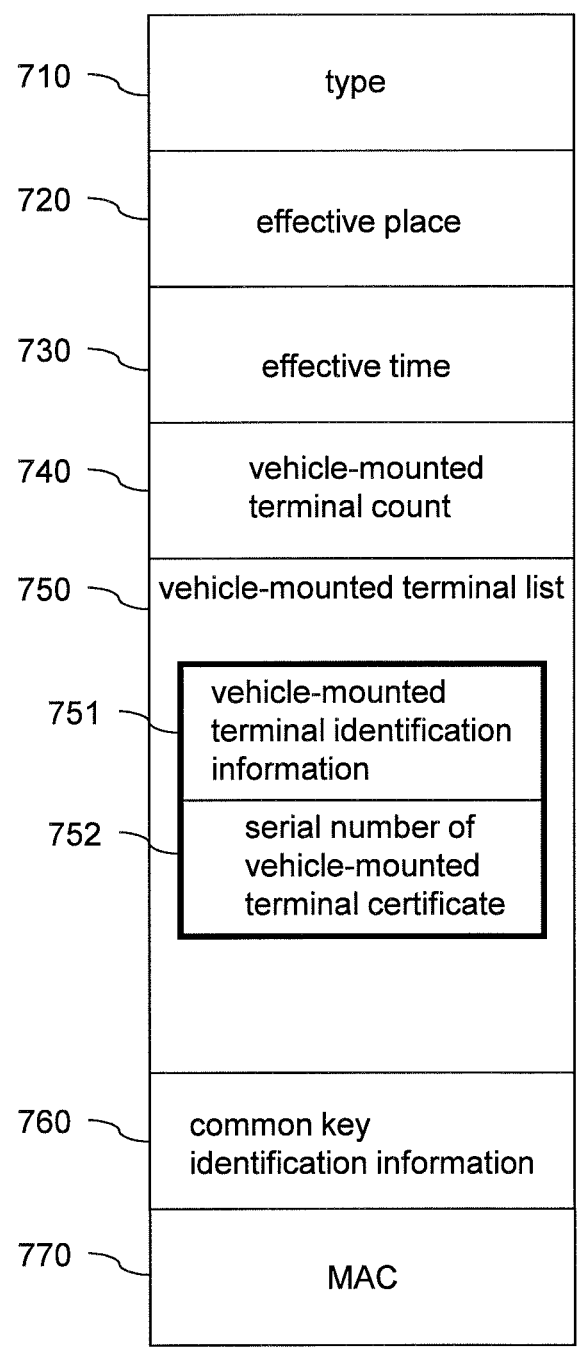
FIG. 7 is an explanatory diagram illustrating a data format for the whitelist and the blacklist.

FIG. 7 illustrates the format for the whitelist and the blacklist. The whitelist and the blacklist contain a type 710, an effective place 720, effective time 730, a vehicle-mounted terminal count 740, a vehicle-mounted terminal list 750, common key identification information 760, and an MAC 770. The type 710 provides an identifier of a whitelist or a blacklist. The effective place 720 indicates a range of place where the whitelist or the blacklist is effective. The effective time 730 indicates the time during which the whitelist or the blacklist is effective. The vehicle-mounted terminal count 740 indicates the number of vehicle-mounted terminals described in the vehicle-mounted terminal list 750. If the type 710 indicates a whitelist, the vehicle-mounted terminal list 750 lists the vehicle-mounted terminal 120 whose vehicle-mounted terminal certificate is valid. If the type 710 indicates a blacklist, the vehicle-mounted terminal list 750 lists the vehicle-mounted terminal 120 whose vehicle-mounted terminal certificate is invalidated. The vehicle-mounted terminal list 750 contains a set of the vehicle-mounted terminal identification information 751 and a serial number 752 of the vehicle-mounted terminal certificate. The common key identification information 760 provides an identifier of the common key used to generate the MAC for the whitelist or the blacklist. The MAC 770 provides an authentication code for the information ranging from the type 710 to the common key identification information 760.

Figure 8:
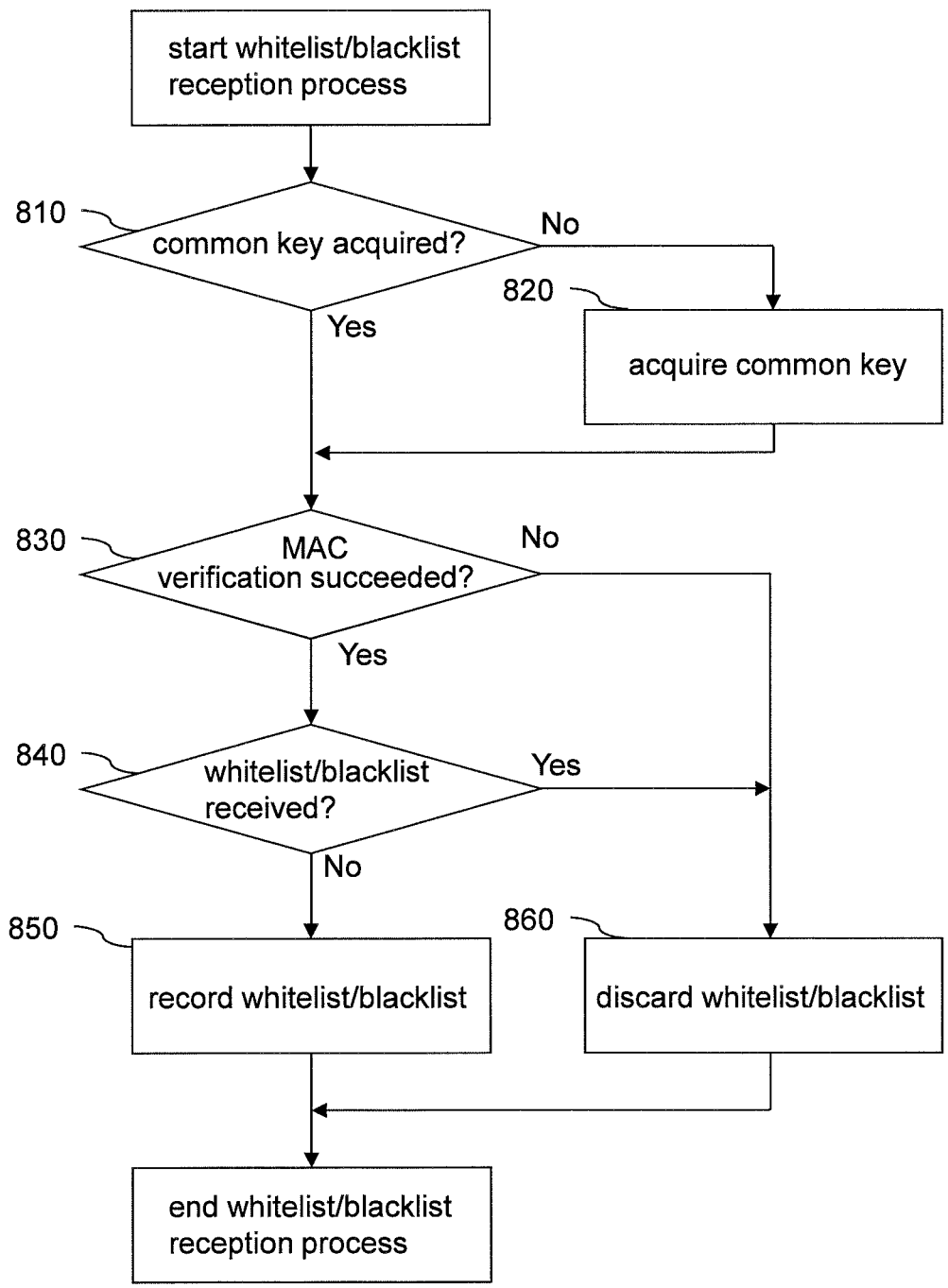
FIG. 8 is a flowchart illustrating a process of receiving a whitelist and a blacklist on the roadside device and the vehicle-mounted terminal.

FIG. 8 is a flowchart illustrating a process of receiving a whitelist and a blacklist on the roadside device 110 and the vehicle-mounted terminal 120.

Suppose that the roadside device 100 receives a whitelist or a blacklist. At step 810, the roadside device 110 determines whether the common key identification information 760 described in the whitelist is available in the common key identification information 404 for the security information storage portion 116. If the common key identification information 760 is unavailable, the roadside device 110 acquires the common key from the certificate authority 100 at step 820. This example assumes a safe communication path between the certificate authority 100 and the roadside device 110 and provides no security measures for the communication path. It is possible to use a scheme of safe key sharing between the roadside device 110 and the vehicle-mounted terminal 120 to be described later. The roadside device 110 may confirm availability of the common key identification information 760 at step 810 or may acquire the common key at step 820. Then, at step 830, the roadside device 110 uses the common key 403 corresponding to the common key identification information 760 to generate an MAC corresponding to the information ranging from the type 710 to the common key identification information 760 in the whitelist or the blacklist. If the generated MAC differs from the MAC 770 in the whitelist or the blacklist, the roadside device 110 discards the whitelist or the blacklist at step 860. If the generated MAC matches the MAC 770 in the whitelist or the blacklist, the roadside device 110 determines whether the same whitelist/blacklist is received. If the same whitelist or blacklist is received, the roadside device 110 discards the whitelist or the blacklist at step 860. If the same whitelist or blacklist is not received, the roadside device 110 records the whitelist or the blacklist received at the whitelist 405 or the blacklist 406 in the security information storage portion 116 at step 850.

When receiving a whitelist or a blacklist, the vehicle-mounted terminal 120 also performs the process from step 810 to step 860 similarly to those for the roadside device 110 that receives a whitelist or a blacklist.

Figure 9:
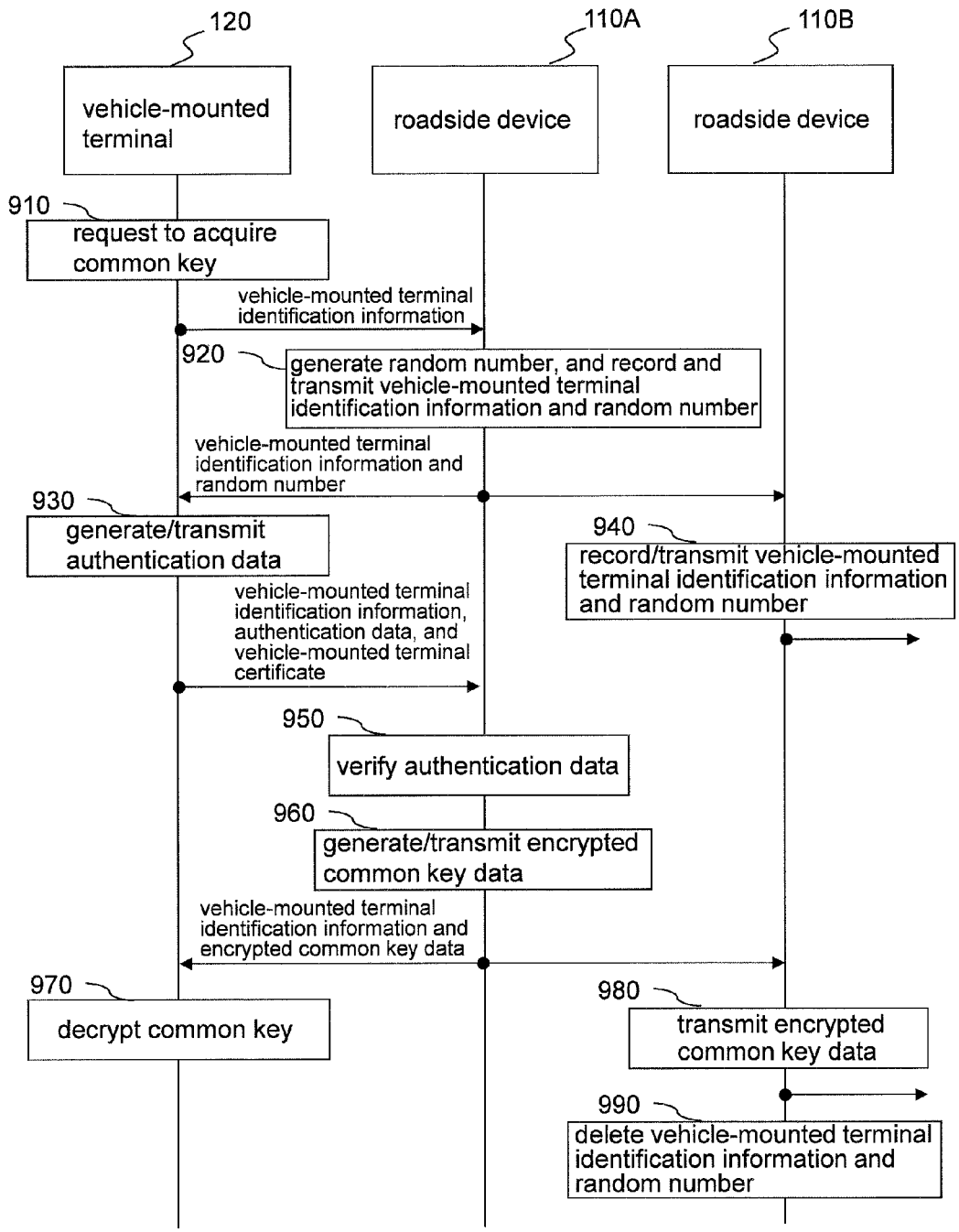
FIG. 9 is a flowchart illustrating sharing of a common key between the roadside device and the vehicle-mounted terminal.

FIG. 9 illustrates how the vehicle-mounted terminal 120 acquires the common key at step 820. At step 910, the vehicle-mounted terminal 120 transmits a common key acquisition request as well as the vehicle-mounted terminal identification information 300 to the roadside device 110A. At step 920, the roadside device 110A generates a random number in response to the request from the vehicle-mounted terminal 120 and transmits the random number to the vehicle-mounted terminal 120. The roadside device 110A transmits the vehicle-mounted terminal identification information received from the vehicle-mounted terminal 120 and the generated random number to the nearby roadside device 110B via the certificate authority 100. The nearby roadside device 110B stores the vehicle-mounted terminal identification information and the random number received at step 940 and broadcasts the received information. The roadside device 110B also transmits the information about key sharing to the nearby roadside device 110A and broadcasts the information to nearby roadside devices 110. The nearby roadside device 120 and the vehicle-mounted terminal 120 can continue key sharing processes even if the vehicle-mounted terminal 120 moves to leave the communication range for the roadside device 110 before the key sharing is completed. In this example, the roadside device 110A transmits the information to the nearby roadside device 110B via the certificate authority 100. However, the roadside device 110A may transmit the information directly to the nearby roadside device 110B.

At step 930, the vehicle-mounted terminal 120 uses its own private key 302 to encrypt the random number received from the roadside device 110 and generates authentication data. The vehicle-mounted terminal 120 transmits the authentication data as well as the vehicle-mounted terminal certificate 301 to the roadside device 110. At step 950, the roadside device 110 verifies the vehicle-mounted terminal certificate and then decrypts the authentication data using the public key described in the vehicle-mounted terminal certificate. If the decrypted value equals the random number generated at step 920, the roadside device 110 recognizes the vehicle-mounted terminal to be valid and proceeds to step 960. Otherwise, the roadside device 110 recognizes the vehicle-mounted terminal to be invalid and terminates the process.

At step 960, the roadside device 110 encrypts the common key 403 and the common key identification information 404 to generate encrypted common key data using the public key described in the vehicle-mounted terminal certificate transmitted from the vehicle-mounted terminal 120. The roadside device 110 transmits the encrypted common key data to the vehicle-mounted terminal 120 and deletes the vehicle-mounted terminal identification information and the random number that are stored. The vehicle-mounted terminal 120 is also effective even if it is outside the communication range for the roadside device 110. The vehicle-mounted terminal 120 therefore transmits the encrypted common key data to the nearby roadside device 110. The nearby roadside device 110 broadcasts the encrypted common key data at step 980 and deletes the vehicle-mounted terminal identification information and the random number at step 990.

At step 970, the vehicle-mounted terminal 120 receives the encrypted common key data and decrypts it using the private key 302 of the vehicle-mounted terminal 120. The vehicle-mounted terminal 120 stores the common key and the common key identification information at the common key 303 and the common key identification information 304 in the security information storage portion 126 to complete the common key sharing.

Figure 10:
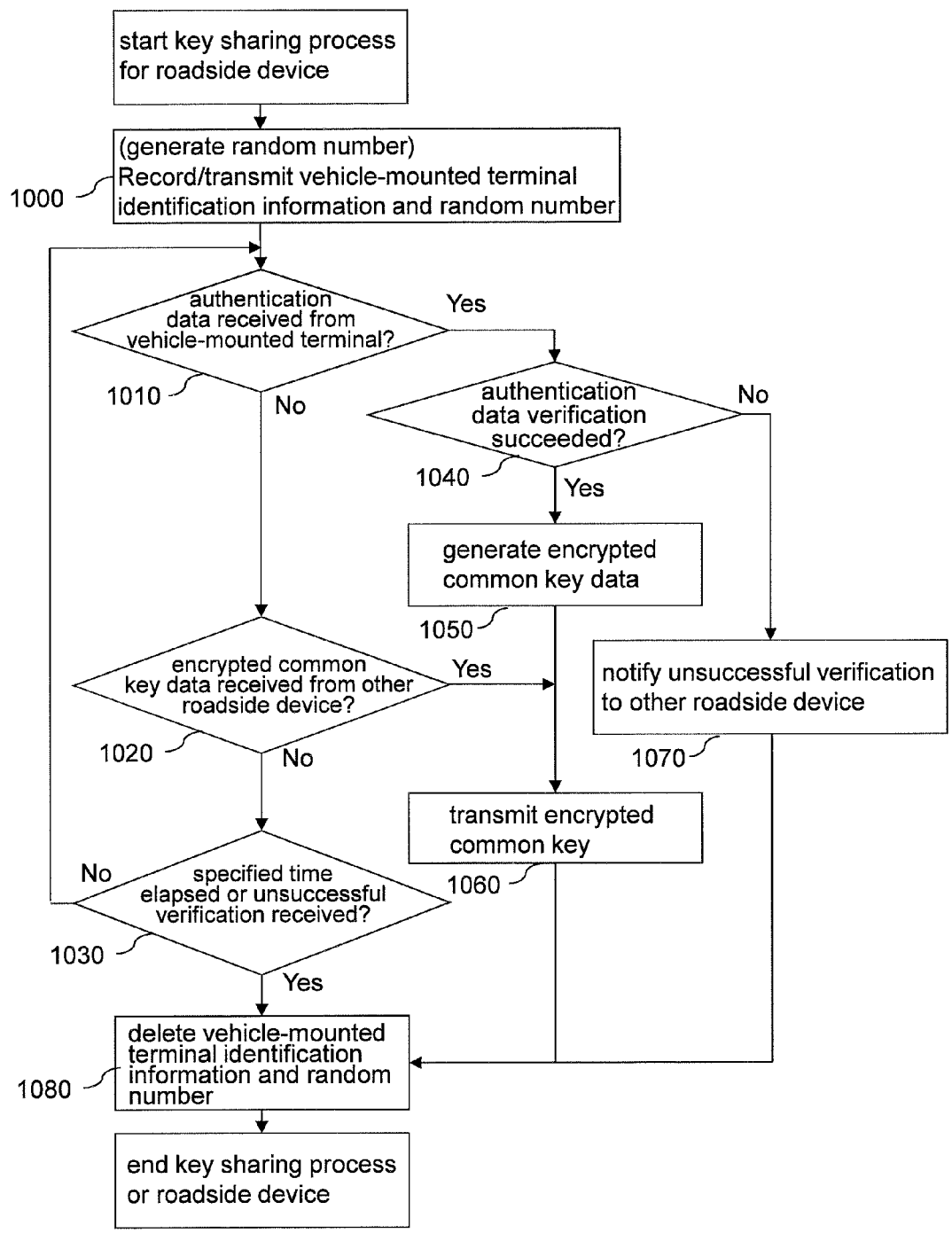
FIG. 10 is another flowchart illustrating sharing of a common key between the roadside device and the vehicle-mounted terminal.

A flowchart in FIG. 10 illustrates a process of the roadside device 110 that receives the common key acquisition request from the vehicle-mounted terminal 120 and shares the key with the vehicle-mounted terminal 120 to cooperate with a nearby roadside device.

Suppose that the roadside device 110 receives the common key acquisition request. At step 1000, the roadside device 110 generates a random number and stores the vehicle-mounted terminal identification information and the generated random number. The roadside device 110 then transmits the vehicle-mounted terminal identification information and the generated random number to the vehicle-mounted terminal 120 and the nearby roadside device 110. When receiving the authentication data from the vehicle-mounted terminal 120, the roadside device 110 assumes the vehicle-mounted terminal 120 to exist in the communication range for the roadside device 110. At step 1040, the roadside device 110 verifies the authentication data. If the verification fails, the roadside device 110 assumes the vehicle-mounted terminal to be invalid. At step 1070, the roadside device 110 notifies the other roadside devices 110 of the unsuccessful verification. At step 1080, the roadside device 110 deletes the vehicle-mounted terminal identification information and the random number recorded and terminates the key sharing process. If the verification succeeds, the roadside device 110 generates encrypted common key data at step 1050. At step 1060, the roadside device 110 transmits the encrypted common key data to the vehicle-mounted terminal 120 and the nearby roadside device 110. At step 1080, the roadside device 110 deletes the vehicle-mounted terminal identification information and the random number recorded and terminates the key sharing process.

The roadside device 110 may not receive authentication data from the vehicle-mounted terminal 120 and receives authentication data from the other roadside device 110. In this case, the roadside device 110 assumes that the vehicle-mounted terminal 120 exists outside the communication range for the roadside device 110 itself and that the nearby roadside device 110 authenticates the vehicle-mounted terminal 120. The roadside device 110 then proceeds to step 1060 and broadcasts the received encrypted common key data. At step 1080, the roadside device 110 deletes the vehicle-mounted terminal identification information and the random number recorded and terminates the key sharing process. The roadside device 110 broadcasts the encrypted common key data, considering a case where the vehicle-mounted terminal 120 exits in communication ranges for more than one roadside device and the wireless communication state is unstable. In such a case, the nearby roadside device 110 verifies the authentication data and generates the encrypted common key data. However, the vehicle-mounted terminal 120 again leaves the communication range for the nearby roadside device 110 and enters the communication range for the roadside device 110 itself.

There may be a case where the roadside device 110 receives neither authentication data from the vehicle-mounted terminal 120 nor encrypted common key data from the other roadside device 110. In such a case, the roadside device 110 awaits reception of authentication data from the vehicle-mounted terminal 120 or encrypted common key data from the other roadside device 110 until a specified time elapses.

The roadside device 110 may be notified of unsuccessful verification from the other roadside device 110. Alternatively, the roadside device 110 may receive nothing after a lapse of the specified time. In either case, the roadside device 110 proceeds to step 1080, deletes the vehicle-mounted terminal identification information and the random number, and terminates the key sharing process.

The roadside device 110 may not receive the common key acquisition request from the vehicle-mounted terminal 120, but acquire the vehicle-mounted terminal identification information and the random number from the other roadside device 110. In such a case, the roadside device 110 does not generate a random number at step 1000. However, the process at step 1010 and later equals that for the roadside device 110 that received the common key acquisition request.

Figure 11:
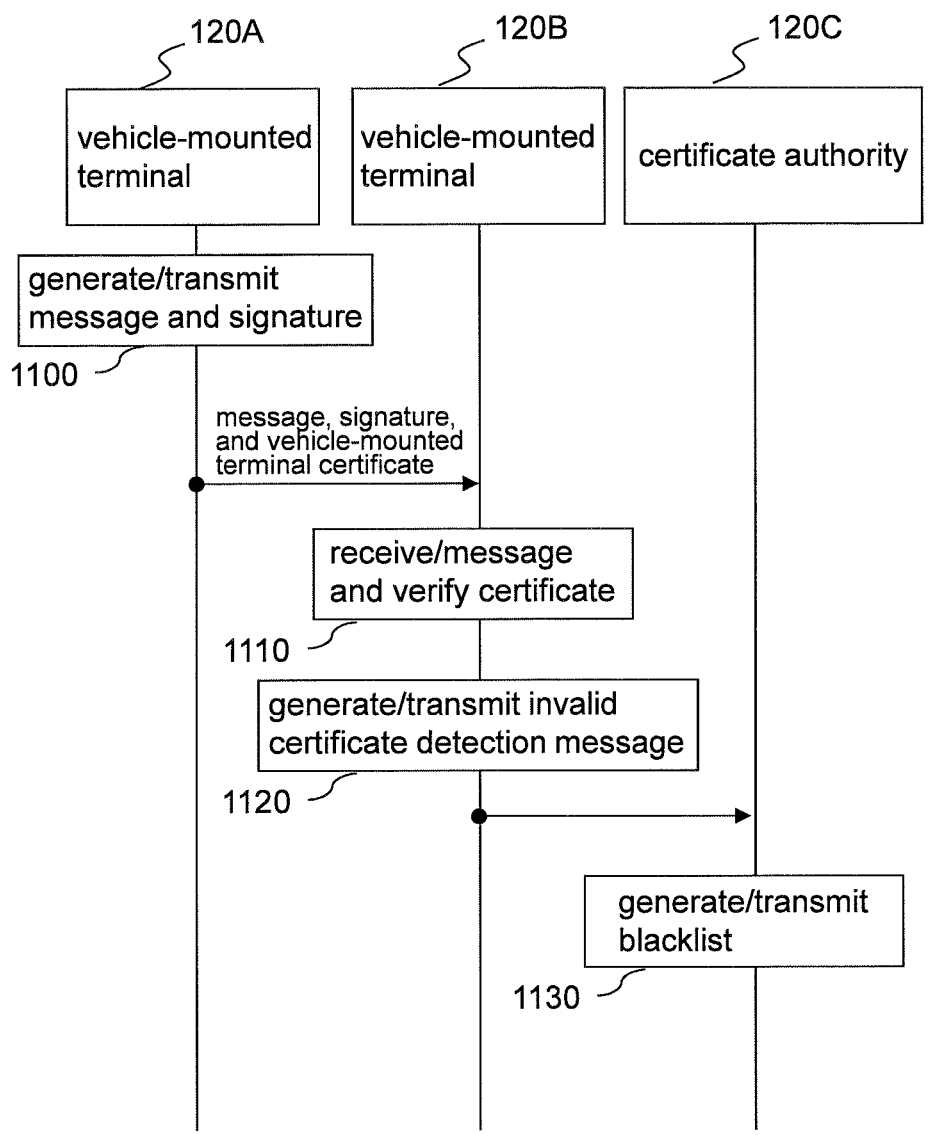
FIG. 11 is a flowchart illustrating a process of detecting a vehicle-mounted terminal whose certificate is invalidated.

FIG. 11 illustrates a process of detecting a vehicle-mounted terminal whose certificate is invalidated when communication is performed between the vehicle-mounted terminals 120A and 120B. At step 1100, the vehicle-mounted terminal 120A transmits a message to the other vehicle-mounted terminal 120B. Specifically, the vehicle-mounted terminal 120A generates a message and a signature for the message, and transmits the vehicle-mounted terminal certificate 301 as well as the message and the signature. At step 1110, the vehicle-mounted terminal 120B receives the message and verifies the vehicle-mounted terminal certificate. When detecting the certificate is invalidated, the vehicle-mounted terminal 120A proceeds to step 1120, generates an invalid certificate detection message, and transmits it to the certificate authority via the roadside device 110. The invalid certificate detection message will be described later. The certificate authority 100 receives the invalid certificate detection message. At step 1130, the certificate authority 100 generates a blacklist and broadcasts it to the roadside device 110 near the place where the invalidated certificate was detected. The certificate verification is time-consuming for the vehicle-mounted terminal 120B that detected the invalidated certificate for the first time. However, the other vehicle-mounted terminal 120 and the roadside device 110 can receive the blacklist from the certificate authority 100 in real time and save the certificate verification time. If the roadside device 110 detects an invalidated certificate, it functions similarly to the vehicle-mounted terminal 120 that detected the invalidated certificate. Namely, the roadside device 110 generates an invalid certificate detection message and transmits it to the certificate authority 100.

The certificate authority 100 may contact the police if the certificate has proven to be invalidated due to theft.

Figure 12:
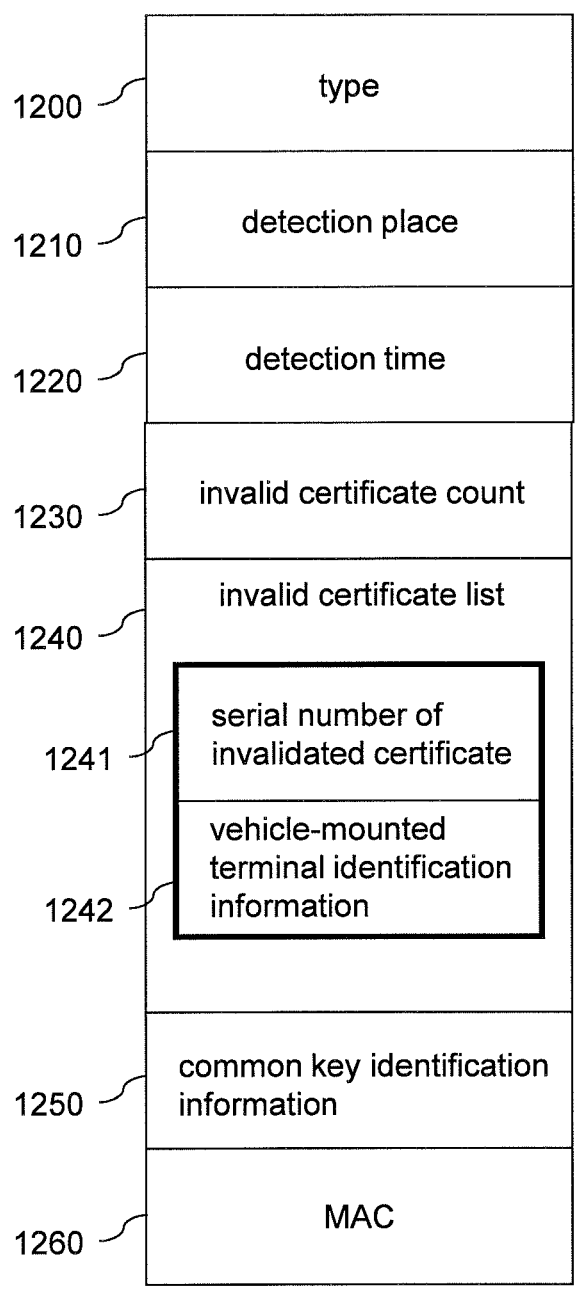
FIG. 12 is an explanatory diagram illustrating a format for an invalid certificate detection message.

FIG. 12 illustrates an example format for an invalid certificate detection message. The invalid certificate detection message contains a type 1200, a detection place 1210, detection time 1220, a detected invalid certificate count 1230, an invalid certificate list 1240, common key identification information 1250, and an MAC 1260. The type 1200 provides an identifier of the invalid certificate detection message. The detection place 1210 indicates a range of place where an invalidated certificate was detected. The detection time 1220 indicates the time when an invalidated certificate was detected. The invalid certificate count 1230 indicates the number of invalid certificates stored in the invalid certificate list 1240. The invalid certificate list 1240 stores information about invalidated certificates. The invalid certificate list 1240 contains a set of a serial number 1241 given to an invalidated certificate and vehicle-mounted terminal identification information 1242. The common key identification information 1250 provides an identifier of the common key used to generate the MAC for the invalid certificate detection message. The MAC 770 provides an authentication code for the information ranging from the type 1210 to the common key identification information 1250.

Figure 13:
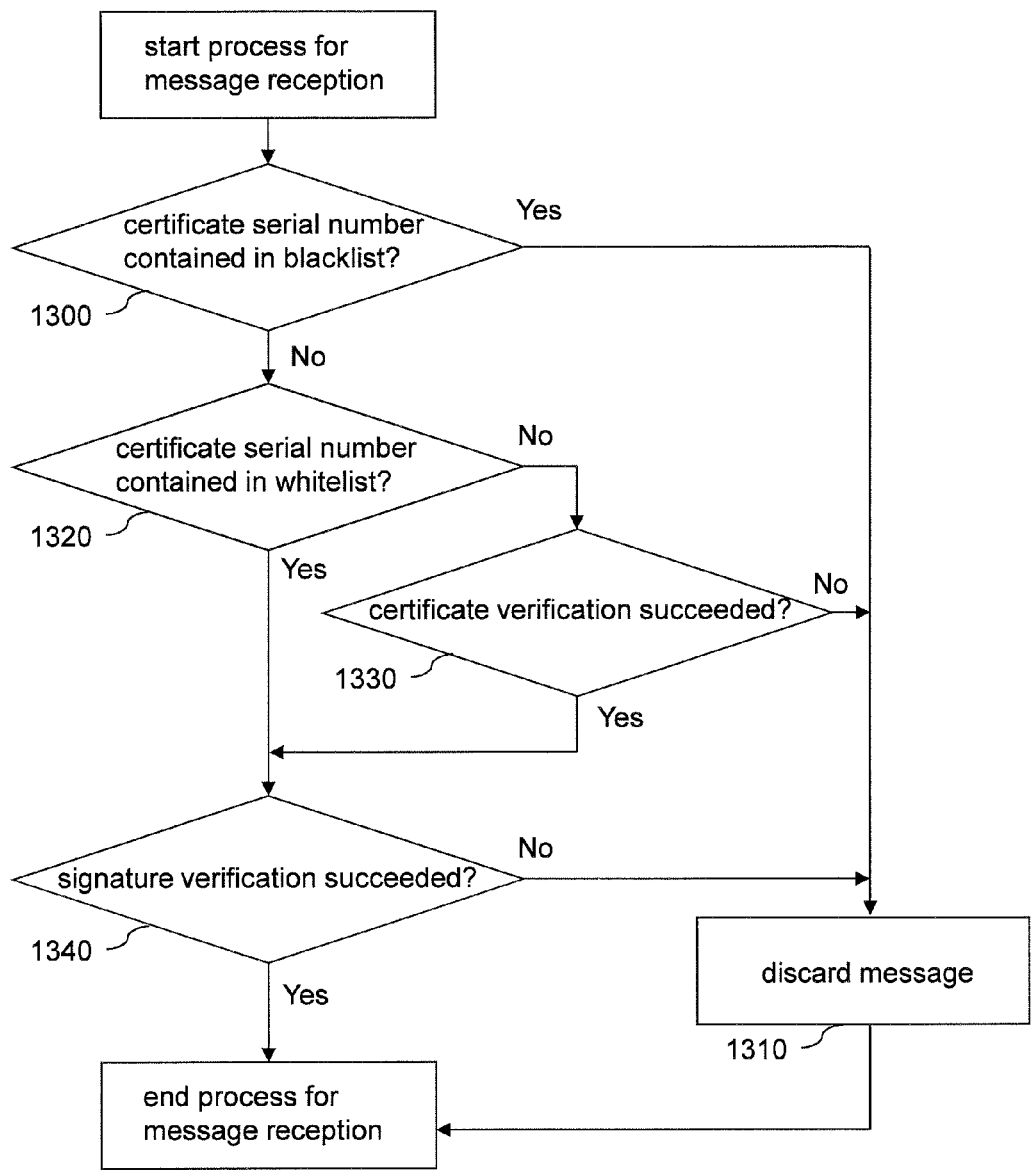
FIG. 13 is a flowchart illustrating a process that allows the roadside device and the vehicle-mounted terminal to receive a message.

FIG. 13 is a flowchart illustrating a process that allows the roadside device 110 and the vehicle-mounted terminal 120 to verify a message. When receiving a message with signature and a certificate, the roadside device 110 or the vehicle-mounted terminal 120 determines at step 1300 whether the blacklist contains the certificate serial number. If the blacklist contains the certificate serial number, the roadside device 110 or the vehicle-mounted terminal 120 proceeds to step 1310, discards the message, and terminates the process. If the blacklist does not contain the certificate serial number, the roadside device 110 or the vehicle-mounted terminal 120 proceeds to step 1320 and determines whether the whitelist contains the certificate serial number. If the whitelist contains the certificate serial number, the roadside device 110 or the vehicle-mounted terminal 120 omits the certificate verification and proceeds to step 1340 for signature verification. If the verification succeeds, the roadside device 110 or the vehicle-mounted terminal 120 successfully terminates the process. If the verification fails, the roadside device 110 or the vehicle-mounted terminal 120 discards the message at step 1310 and terminates the process. If the whitelist does not contains the certificate serial number at step 1320, the roadside device 110 or the vehicle-mounted terminal 120 proceeds to step 1330 and verifies the certificate. If the verification succeeds, the roadside device 110 or the vehicle-mounted terminal 120 proceeds to step 1340. If the verification fails, the roadside device 110 or the vehicle-mounted terminal 120 discards the message at step 1310 and terminates the process. The certificate verification may fail because the certificate is invalidated at step 1330. In this case, the roadside device 110 or the vehicle-mounted terminal 120 generates an invalid certificate detection message and transmits it to the certificate authority 100.

This example detects an invalidated certificate, notifies this to the certificate authority 100 in real time, and generates the blacklist. The example is also applicable to generation of the whitelist. As described above, if the whitelist and the blacklist contain the vehicle-mounted terminal, omitting the certificate verification for the vehicle-mounted terminal can shorten the message verification time.

The whitelist and the blacklist contain the effective place and the effective time. The vehicle-mounted terminal 120 periodically checks the effective place 720 and the effective time 730 in the whitelist and the blacklist maintained in the vehicle-mounted terminal 120. The vehicle-mounted terminal 120 allows the whitelist/blacklist processing portion 122 to delete the whitelist and the blacklist if the vehicle-mounted terminal 120 exists outside the effective place or exceeds the effective time. Like the vehicle-mounted terminal 120, the roadside device 110 can also allow the whitelist/blacklist processing portion 112 to delete the whitelist and the blacklist. However, verification of the effective place 720 may be omitted because the roadside device 110 is fixed to the roadside. The whitelist and the blacklist are generated based on the place and the time and are periodically verified. Deleting the whitelist and the blacklist, if ineffective, can save the available memory.

While there have been described specific preferred embodiments of the present invention, it is to be distinctly understood that the present invention is not limited thereto but may be otherwise variously embodied within the spirit and scope of the invention.

INDUSTRIAL APPLICABILITY

The present invention is widely applicable to a communication technology that ensures message validity using a public key encryption system for road-to-vehicle or vehicle-to-vehicle communication.

The invention claimed is:

1. A communication system comprising:
    a certificate authority configured to perform authentication;
    a roadside device configured to be provided at a roadside;
    a plurality of vehicle-mounted terminals each having a certificate;
    a first server configured to collect position information about the vehicle-mounted terminals; and
    a second server configured to manage information about the roadside device and vehicle-mounted terminals whose certificate is invalidated,
    wherein the communication system is configured to transmit and receive information between the roadside device and the vehicle-mounted terminals and between the vehicle-mounted terminals,
    wherein the vehicle-mounted terminals are each configured to transmit its own position information to the first server,
    wherein the certificate authority is configured to:
        acquire appearance information about vehicle-mounted terminals whose likelihood of appearing is greater than a predetermined threshold, the certificate authority acquires the appearance information according to place and time from the first server;
        allow the second server to verify the validity of a certificate of a vehicle-mounted terminal that is acquired from the first server;
        generate a first list of vehicle-mounted terminals having valid certificates and a second list of vehicle-mounted terminals having invalid certificates according to place and time based on a verification result; and
        transmit the first list and the second list to the roadside device and the vehicle-mounted terminals; and
    wherein the roadside device and the vehicle-mounted terminals are configured to verify a certificate using the received first and second lists.

2. The communication system according to claim 1,
    wherein, in response to receiving a message from a message sender on the second list, the roadside device and the vehicle-mounted terminal that received the message omit certificate verification and discard the message, and
    in response to receiving a message from a message sender on the first list, the roadside device and the vehicle-mounted terminal that received the message omit certificate verification and verify a signature.

3. The communication system according to claim 2,
    wherein, in response to a certain vehicle-mounted terminal acquiring a common key needed to verify a validity of the first list and the second list from the roadside device, the roadside device transmits information needed for authentication and key sharing to the certain vehicle-mounted terminal and another roadside device.

4. The communication system according to claim 3,
    wherein the roadside device and the certain vehicle-mounted terminal confirm an effective place and an effective time in the first list and the second list, and if the roadside device and the vehicle-mounted terminal satisfy one of conditions of existing outside the effective place and exceeding the effective time, the first list and the second list are deleted.

5. The communication system according to claim 4,
    wherein the roadside device or the certain vehicle-mounted terminal detects an invalidated certificate during one of vehicle-to-vehicle communication and road-to-vehicle communication, and notifies this information to the certificate authority, and
    wherein the certificate authority generates the second list and transmits the second list to the roadside device and at least one of the vehicle-mounted terminals.

6. A vehicle-mounted terminal that transmits and receives information from one of a roadside device and another vehicle-mounted terminal, the vehicle-mounted terminal comprising:
    a storage portion configured to store a first list of vehicle-mounted terminals having valid certificates according to place and time and a second list of vehicle-mounted terminals having invalidated certificates; and
    a signature generation/verification portion configured to:
        omit certificate verification and discard a received message in response to receiving the message from a sender on the second list;
        omit certificate verification and verify a signature in response to receiving a message from a sender on the first list; and
    a processing portion configured to:
    confirm an effective place and an effective time in the first list and the second list, and in response to the vehicle-mounted terminal existing outside the effective place and/or exceeding the effective time, delete the first list and the second list.

7. A roadside device that transmits and receives information from a vehicle-mounted terminal, the roadside device comprising:
    a storage portion configured to store a first list of vehicle-mounted terminals having valid certificates according to place and time and a second list of vehicle-mounted terminals having invalidated certificates;
    a signature generation/verification portion configured to:
        omit certificate verification and discard a message received from a certain vehicle-mounted terminal in response to the second list listing the certain vehicle-mounted terminal; and
        omit certificate verification and verify a signature in response to receiving a message from a sender on the first list; and
    a processing portion configured to confirm an effective time in the first list and the second list, and delete the first list and the second list in response to the roadside device exceeding the effective time.

8. The roadside device according to claim 7, comprising:
    a communication control processing portion configured to transmit, to a vehicle-mounted terminal and another roadside device, information needed for authentication and key sharing in response to the vehicle-mounted terminal acquiring a common key needed to verify a validity of the first list and the second list from the roadside device.

* * * * *